(12) United States Patent
Nowlan et al.

(10) Patent No.: US 7,539,796 B2
(45) Date of Patent: May 26, 2009

(54) CONFIGURATION MANAGEMENT OF AN ELECTRONIC DEVICE WHEREIN A NEW CONFIGURATION OF THE ELECTRONIC DEVICE IS SELECTED BASED ON ATTRIBUTES OF AN APPLICATION

(75) Inventors: Steven Nowlan, South Barrington, IL (US); William F. Zancho, Hawthorn Woods, IL (US); Jon Godston, Chicago, IL (US); Kenneth W. Douros, South Barington, IL (US); Maria B. Thompson, Hoffman Estates, IL (US); Christopher W. Drackett, Chicago, IL (US); Deborah A. Matteo, Schaumburg, IL (US)

(73) Assignee: Motorola, Inc., Schaumburg, IL (US)

( * ) Notice: Subject to any disclaimer, the term of this patent is extended or adjusted under 35 U.S.C. 154(b) by 158 days.

(21) Appl. No.: 11/694,549

(22) Filed: Mar. 30, 2007

(65) Prior Publication Data
US 2008/0243766 A1   Oct. 2, 2008

(51) Int. Cl.
*G06F 13/00* (2006.01)
*G06F 17/30* (2006.01)

(52) U.S. Cl. .................. 710/72; 710/8; 710/9; 710/10; 710/73; 710/71; 710/301; 709/228; 705/26; 705/40; 707/2; 707/9

(58) Field of Classification Search ............... 710/8–10, 710/72–74, 301; 705/40, 26; 707/9, 2; 709/228
See application file for complete search history.

(56) References Cited

U.S. PATENT DOCUMENTS

| | | | |
|---|---|---|---|
| 5,633,484 A | | 5/1997 | Zancho et al. |
| 6,233,577 B1 * | | 5/2001 | Ramasubramani et al. ..... 707/9 |
| 6,530,083 B1 | | 3/2003 | Liebenow |
| 6,611,869 B1 * | | 8/2003 | Eschelbeck et al. ......... 709/228 |
| 6,735,593 B1 | | 5/2004 | Williams |
| 6,886,007 B2 | | 4/2005 | Leymann et al. |
| 6,926,199 B2 * | | 8/2005 | Jay et al. .................... 235/375 |

(Continued)

FOREIGN PATENT DOCUMENTS

JP    10-500512 A    1/1998

(Continued)

OTHER PUBLICATIONS

PCT/US2008/056956, PCT International Search Report and Written Opinion, Dated Aug. 14, 2008 from Corresponding application.

(Continued)

*Primary Examiner*—Tammara Peyton

(57) ABSTRACT

A configuration of an electronic device (400) is managed by obtaining (1005) stakeholder attributes of a component resident in the electronic device from stakeholder requirements (FIGS. 7, 8) of one or more stakeholders and correlating (1020) the respective stakeholder attributes as well as available sets of values of attributes of the component to determine (1025) a set of selected values of the attributes, and establishing (1030) at least a portion of a new configuration of the electronic device using the set of selected values of the attributes of the component. When the stakeholder requirements cannot be met with an existing application in the electronic device, the application may be formed (1200) from components of existing applications.

5 Claims, 12 Drawing Sheets

U.S. PATENT DOCUMENTS

| | | |
|---|---|---|
| 2002/0099456 A1 | 7/2002 | McLean |
| 2002/0149618 A1 | 10/2002 | Estrada et al. |
| 2003/0046401 A1 | 3/2003 | Abbott et al. |
| 2003/0093374 A1* | 5/2003 | Fenlon et al. ............... 705/40 |
| 2004/0230447 A1 | 11/2004 | Schwerin-Wenzel et al. |
| 2004/0254957 A1 | 12/2004 | Hyotyniemi et al. |
| 2005/0086579 A1 | 4/2005 | Leitner et al. |
| 2005/0091674 A1 | 4/2005 | Knight et al. |
| 2005/0105727 A1 | 5/2005 | Takashima et al. |
| 2005/0198628 A1 | 9/2005 | Graham et al. |
| 2005/0240621 A1 | 10/2005 | Robertson et al. |
| 2006/0190608 A1 | 8/2006 | Sahinoja et al. |
| 2006/0196686 A1 | 9/2006 | Gatto et al. |
| 2006/0285508 A1 | 12/2006 | Vermola et al. |
| 2007/0050756 A1 | 3/2007 | Paller |

FOREIGN PATENT DOCUMENTS

| | | |
|---|---|---|
| KR | 10-2006-0014302 A | 2/2006 |
| KR | 10-2007-0008001 A | 1/2007 |

OTHER PUBLICATIONS

PCT/US2008/056958, PCT International Search Report and Written Opinion, Dated Aug. 18, 2008 from Related application.

PCT/US2008/056949, PCT International Search Report and Written Opinion, Dated Aug. 13, 2008 from Related application.

* cited by examiner

Stakeholder Requirements Table 205

Each Column = A characteristic or attribute

Each Row = A capability
212

Set of values and related priority for each intersection of row and column

Available Components Table 210

Each Column = An attribute

Each Row = A component
222

Set of values for each intersection of row and column

Desired Capabilities Table 220

Each Column = A characteristic or attribute

Each Row = A capability
242

Set of values for each intersection of row and column

Selected Component Values Table 215

Each Column = An attribute

Each Row = A component
232

Set of values for each intersection of row and column

*FIG. 2*

ATTRIBUTES

| | MPEG AUDIO | WAV AUDIO | MIDI AUDIO | MPEG VIDEO | JPG IMAGE | UART |
|---|---|---|---|---|---|---|
| 176 X 220 COLOR LCD DISPLAY | | | | X | x | |
| BELL MEMBRANE KEYPAD | | | X | | | |
| POLYPHONIC SPEAKER | X | X | X | | | |
| ROTARY VIBRATOR | | | X | | | |
| 2MP CAMERA | | | | x | x | |
| DYNAMIC MIC | | | | | | |
| BLUETOOTH | | | | | | x |
| 802.11B | | | | | | x |
| IrDA | | | | | | x |

DEVICE COMPONENTS

SET OF AVAILABLE COMPONENTS

USER INTERFACE CATEGORY
( ATTRIBUTES)

|  | VISUAL | AUDIBLE | TACTILE | OLFACTORY |
|---|---|---|---|---|
| ALERTS | 0-20 | 0-10 | 0-10 | 0-5 |
| KEYS |  |  | 0-1 |  |
| KEYPRESS |  | 0-15 |  |  |
| TEXT | 0-25 | 0-1 |  |  |
| VIDEO | 0-100 |  |  |  |
| IMAGE | 0-50 |  |  |  |

DESIRED CAPABILITIES

605

DESIRED
CAPABILITIES
TABLE

|  | HARDWARE | | | | | |
|---|---|---|---|---|---|---|
|  | PROTOCOL | | | | OUTPUT | |
|  | GSM | WIFI | BLUETOOTH | AUDIO CHIP | VISUAL | |
|  |  |  |  |  | LCD | LED |
| IDLE SCREEN | S4 |  |  |  | S5, S2 |  |
| PHONE CALL | S2, S1, S3 |  | S1 |  |  |  |
| MUSIC PLAYER | S1, S3 |  | S3 | S3, S2, S1 |  |  |
| MESSAGING | S3, S2 |  |  |  |  |  |

APPLICATIONS (row labels)

STAKEHOLDER HARDWARE REQUIREMENTS TABLE
700

STAKEHOLDER PRIORITY SEQUENCE
710

*FIG. 7*

STAKEHOLDER SOFTWARE REQUIREMENTS TABLE 800

| | PROTOCOL | | OUTPUT | | | | | | INPUT | | |
|---|---|---|---|---|---|---|---|---|---|---|---|
| | GSM | JAVA | OPMP | VISUAL | | AUDIBLE | | HAPTIC | SMELL | VISUAL | |
| | | | | SVG | FLASH | RING TONES | SPEECH GENERATOR | VIBRATE PROFILE | SIGNATURE SMELL | GESTURE INTER-PRETATION | LIP READING | VIDEO RECORDING |
| IDLE SCREEN | | S1 | | S1, S2, S3 | S1 | | | | | | | |
| PHONE CALL | S1, S2, S3 | | | S1, S2, S3 | | S1, S3 | | S1 | | | | |
| MUSIC PLAYER | S1, S3 | | S3 | S1, S2, S3 | | | | | | | | |
| MESSAGING | S1, S2 | | | S1, S2, S3 | | | | | | | | |
| CAMERA | S1 | | | S1, S2, S3 | | | | | | | | S1 |

APPLICATIONS

*FIG. 8*

CONFIGURATION MANAGEMENT OF AN ELECTRONIC DEVICE WHEREIN A NEW CONFIGURATION OF THE ELECTRONIC DEVICE IS SELECTED BASED ON ATTRIBUTES OF AN APPLICATION

RELATED APPLICATIONS

This application is related to applications being filed concurrently with the USPTO, and assigned to the assignee hereof, identified as: "THEME RECORDS DEFINING DESIRED DEVICE CHARACTERISTICS AND METHODS OF SHARING", Ser. No 11/694593; and "STAKEHOLDER CERTIFICATES", Ser. No. 11/694576.

TECHNICAL FIELD

The present inventions relate to electronic devices and systems and, more particularly, relate to customization thereof.

BACKGROUND OF THE INVENTIONS

Systems have been used for customizing computers and mobile telephones. Typically these systems provided for user level preference settings such as display language, alert settings, service level (such as media bandwidth) and font, within limitations defined by a service provider or the user, or a manufacturer, etc., and combinations thereof. However, conflicts between the entities that affect preference settings can cause extra work and complexity for the user.

Advanced systems and devices for determining and setting customizations are needed.

BRIEF DESCRIPTION OF THE DRAWINGS

Details of embodiments of concepts that include the claimed inventions will be more readily understood from the following detailed description when read in conjunction with the accompanying drawings wherein:

FIG. 2 is a diagram that illustrates a set of table arrangements that may be used in certain embodiments.

FIG. 5 is a diagram of an exemplary available components table according to some embodiments.

FIG. 6 is a diagram of an exemplary desired capabilities table according to some embodiments.

FIG. 7 shows a stakeholder requirements table of exemplary hardware features for applications, in accordance with certain embodiments.

FIG. 8 shows a stakeholder requirements table of exemplary software features for applications, in accordance with certain embodiments

DETAILED DESCRIPTION OF THE PREFERRED EMBODIMENTS

In accordance with some aspects of the embodiments of portable electronic devices described herein, such as mobile telephones, multimedia players, portable gaming units, cameras, and a Personal Digital Assistant (PDA), or portable computers, or portable devices that are combinations of these devices, provide a variety of functions that are determined by a combination of components of the electronic device and by establishment of values for configurable attributes of the components of the electronic device, which is referred to herein as the configuration of the electronic device. The components being referred to herein may be described as sub-functions of the electronic device, and often involve human interface modalities or manipulation of stored information, that are combined into each of a number of applications that execute independently on the electronic device. These applications typically offer or require substantial human interface. Often these applications appear to the user to be executed substantially non-concurrently, which may in fact be true due to the processing constraints in such portable electronic devices. The components that are used in more than one of the applications may be configured differently for use in each application, and the software aspects of such components used in a plurality of applications may be duplicated for use in each of the plurality of applications, although in some implementations they may be able to be designed to share common subroutines that are shared at a low level without being duplicated, as is known in the art. Other types of applications, notably radio operating applications, may exist that do run concurrently with those described above that a user perceives as being the only one running. A prevalent example of this situation is a set of radio modem functions that operate concurrently with those that are user input-output related.

The configuration of the electronic device being referred to herein refers to the combination of the components of the applications that are resident within the device, and to values of attributes of those components that are established and which are typically non-changeable during normal use of the application. The applications may have settings that can be changed by the user during the normal operation of the electronic device. These settings may be restricted to be within range limits. In the terms of this document, the limits established for such user settings would typically be attributes whose values are part of the configuration of the electronic device, while a particular user setting would not be such an attribute. An example of this would be a volume setting, for which the minimum and maximum limits may be attributes of the configuration the electronic device, but the user chosen setting would not be such an attribute.

Figure 1:
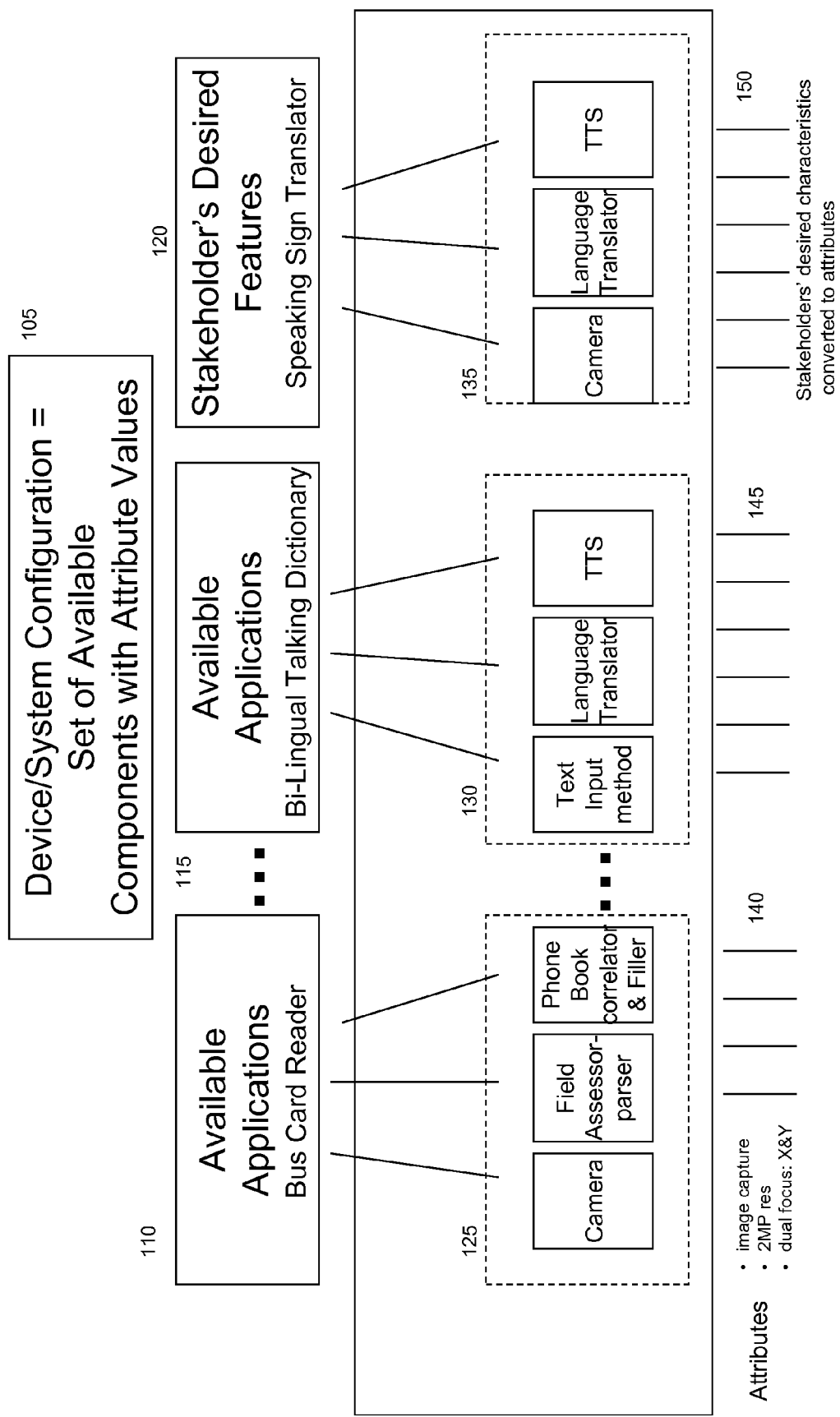
FIG. 1, a block diagram of a relationship of functional aspects of an exemplary electronic device is shown, in accordance with certain embodiments.

Referring now to FIG. 1, a block diagram of a relationship of functional aspects of an exemplary electronic device is shown, in accordance with certain embodiments. As illustrated by FIG. 1, the configuration of an electronic device (alternatively termed system) 105 may be defined by a set of applications, as exemplified by applications 110, 115. A new desired major function of the electronic device is typically described in terms of a feature 120. They are shown at the same level of the hierarchy of FIG. 1 to illustrate that there is strong similarity between the concepts of application and feature. It should be noted that the term application is typically used by entities such as a manufacturer of or software developer of the electronic device to refer to a major function of the electronic device, while marketers and end users may refer to the desired (or existing) major functions as features. In general, end users and marketers do not divide up the world in the same way an application developer or a manufacturer would. As a result, although quite similar, there is rarely a one to one correspondence between applications and features. A feature may describe an entire application, or a part of an application, or it may even correspond to a set of common elements that exist across several applications. In order to relate features and applications more easily, it is necessary to break both features and applications into smaller pieces which can more easily correspond to each other. As illustrated in FIG. 1, each application 110, 115 comprises corresponding sets of components 125, 130, and each feature 120 comprises corresponding sets of capabilities (of which one set 135 is shown in FIG. 1). A component is a function that comprises what may be called an applet or servlet and may comprise associated hardware. The following non-limiting examples of components are shown in FIG. 1: camera, field assessor-parser, phone book correlator and filter, text input method, language translator, and text to speech (TTS). For each component in the sets of components 125, 130, there exists a set of attributes 140, 145. For each component, sets of values must be established to define a configuration of the electronic device. Similarly, for capabilities of a desired feature, there will generally be a set of characteristics 150. For each characteristic, sets of values must be provided in order to define a configuration of the electronic device. In order to define a new configuration of the electronic device from a desired feature, in which the new configuration will consist of new values of attributes for an application (either existing or newly generated) of the electronic device, the sets of values of the characteristics must necessarily be ultimately defined in terms of values that are within groups of values that correspond to the values of the attributes of the corresponding application. In some instances, a conversion process may be necessary to determine values for a desired feature that correspond to the values of the attributes of the corresponding application. In other instances, they may be specified using the values of the attributes of the corresponding application. For these reasons, the set of capabilities 135 is shown at the same level of hierarchy as the sets of components 125, 130, and the attributes that result directly or by conversion from the characteristics are shown at the same level of hierarchy as the attributes of the components. It should be noted that although the capabilities shown as examples in FIG. 1 have the same names as some of the components shown in FIG. 1, they may have characteristics specified using values different than those used for the attributes of the corresponding components.

The user of an electronic device as well as the manufacturer of the electronic device, the service provider for the electronic device, the seller of the electronic device, and the application or software provider of the electronic device may all desire influence over a configuration of the electronic device, and for this reason are termed stakeholders. Other possible stakeholders include a content owner and an environment location owner, each of which may desire influence over a configuration. The embodiments of the present inventions provide a system for achieving configuration of the electronic device based on stakeholder "requirements".

FIG. 2 is a diagram that illustrates a set of table arrangements that may be used in certain embodiments. A stakeholder requirements table 205 includes of sets of values and priorities used to define the stakeholder requirements for an application desired or authorized by a stakeholder. An available component table 210 stores available sets of values for the components of the electronic device. A selected component values table 215 (which may alternatively be referred to as an allowed component values table) stores selected sets (allowed sets) of values for components. The selected values result from a process that uses stakeholder requirements and the available sets of values for attributes of the components to determine the selected values of the components of an application, which define the configuration of an electronic device relative to the application. The available sets of values are those that are within the limits of the available resources of an electronic device. Each stakeholder requirement may be specified as desired sets of values that correspond to attributes of the components of a corresponding application, which may be stated more simply as the attributes of the corresponding application. Each desired set of values may have a related priority (in some embodiments, the priority of all sets of values of an attribute are the same, and for these embodiments, it may be said that the attribute has a priority). These desired sets of values and related priorities are collectively termed the stakeholder attributes. The desired sets of values and priorities of the stakeholder attributes may be stored in a memory in any of many different ways that are known in the art, but for comprehension of certain processes described herein are being shown as a stakeholder requirements table 205 that comprises each desired set of values being stored at an intersection of an attribute and a capability. Each capability with its associated sets of values of attributes may be termed a stakeholder capability record 212. The available and selected sets of values of sets of attributes of the components may likewise be stored in memory in any of many different ways, but are illustrated by component tables 210, 215 comprising each available or selected set of values being stored at an intersection of an attribute and a component. The sets of available or selected values of the attributes of the components do not have priorities, since the selected values have been established by the processes described herein below, using the priorities (in some cases).

In certain embodiments, the sets of values of desired capabilities for a stakeholder have no priorities associated with them, and a table of the capabilities may be referred to as a desired capabilities table 220 (FIG. 2) instead of a stakeholder table. In this instance, certain methods described below may be used to determine the selected values for the components without using priorities.

Figure 3:
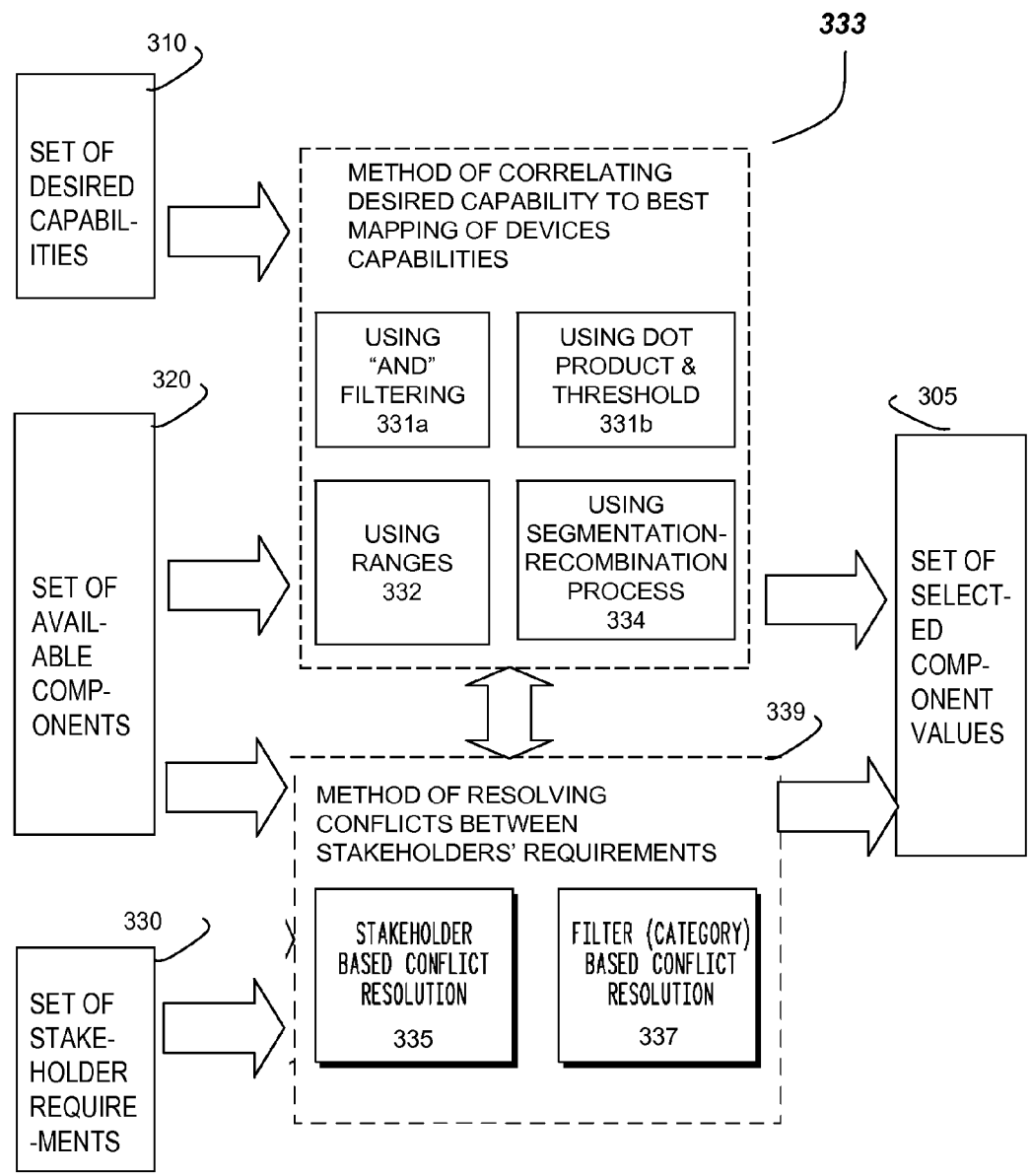
FIG. 3 is a block diagram of a system according to some embodiments.

FIG. 3 is a block diagram of a system according to some embodiments. A set of desired capabilities 310 may be of the form described as the desired capabilities table 220 (FIG. 2), comprising a set of desired capability records 242. Each desired capability record 242 represents a set of values of attributes desired for each capability by a stakeholder, such as a user of the electronic device. One of a plurality of filtering methods 333 may use the desired capability records 242 to determine operation characteristics for components of an electronic device, within the constraints imposed by a set of available component values 320.

The set of available components 320 may be of the form described as the available components table 210 (FIG. 2), comprising a set of available component records 222. Each available component record 222 may be described as comprising sets of values, associated with a set of attributes that are available for one of the various components of the electronic device.

As stated above, each desired capability record 242 represents a set of values of attributes for each capability. The attributes may be user interface elements. Example capabilities are alerts, keys, text, video and image. The set of values for each attribute defined in a desired capability record 242 are values such as on or off, list selections, numbers or ranges.

A set of values can define an attribute such as desired persistence, for example, of an alert or a key press. The ranges can be defined by a desired maximum and minimum range of values for one or more attributes such as user interface elements. A discrete value can be a desired value for one or more user interface elements. At any given time, although there may be only one desired capability record 242 for the system to filter, in some instances several desired capability records 242 for different stakeholders will be presented in a desired capabilities table 220 for one electronic device.

When the system receives a set of desired capabilities 310 for an electronic device, one or more of the filtering methods 333 are used to select which values of attributes may be used in the electronic device. In a first approach that uses AND filtering, the filtering method 331a (FIG. 3) combines discrete desired capability records of a desired capabilities table to find values of attributes common to the capability records 242 of a desired capability table 220. If all values of the attributes of all desired capability table are known to be within the corresponding sets of values of attributes in the set of available components 320, then the values determined by this filtering of desired values can be stored as a set of selected component values 305, which serve to define at least a part of the configuration of the electronic device. (The set of selected component values is a simplified name for the set of selected values of the attributes of the components used in the electronic device.) If, however, this is not the case, then the filtering 331a may also include a further filtering operation of one of the types 331a, 331b, 332 between the result of the AND filtering operation and the values in the set of available components 320 to bring the filtered desired values within range of the sets of values of available attributes. This process can be made clearer by referring to the sample elements shown in FIG. 1. For simplicity, we will assume that the components 125, 130, 135 shown are atomic, so we will not worry about the attribute level. Assuming our device has only the components illustrated, so the available components can be represented by a vector of length 6, with all elements set to 1 (1,1,1,1,1,1). The desired capability record for the "business card reader" is the vector (1,1,1,0,0,0) and the desired capability record for the "bi-lingual talking dictionary" is (0,0,0,1,1,1). If we want a device with both a business card reader and a bi-lingual talking dictionary, we simply have (1,1,1,0,0,0) AND (0,0,0,1,1,1) which produces the selected components vector (1,1,1,1,1,1). (Note that we are using AND as the set union operation in this case). Similarly, a device that has both a bi-lingual talking dictionary and a speaking sign translator (0,0,0,1,1,1) AND (1,0,0,0,1,1) which produces (1,0,0, 1,1,1). These fully filtered values may then be stored as the values of attributes of the set of selected component values 305. The set of selected component values 305 may be stored in a table 215 in a form similar to that of the available components table 210. The selected component values table 215 comprises selected component records 232.

In a second approach using a vector dot product coupled with a threshold, a filtering method 331b (FIG. 3) is used to trigger a limit on the sets of values in one or more desired capability records 242. Again referring to FIG. 1 and the features shown there, if we take the dot product of the desired capability record for the business card reader (1,1,1,0,0,0) and the bi-lingual talking dictionary (0,0,0,1,1,1) the result is 0. On the other hand, if we take the dot product of the desired capability record for the speaking sign translator (1,0,0,0,1,1) and the bi-lingual talking dictionary (0,0,0,1,1,1) we get a result of 2. So the bi-lingual talking dictionary and the speaking sign translator are much better correlated in terms of the required device capabilities. If we set a compatibility threshold of 1 or greater, than we would decide that the business card reader and speaking sign translator conflicted too much to be an acceptable combination, but the speaking sign translator and the bi-lingual talking dictionary were an acceptable combination. In a manner similar to that explained for the filtering method 331a, the filtering method 331B may also include a filtering of one of the types 331a, 331b, 332 between the result of the vector dot product/threshold operation and the values in the set of available components 320 before a final result is stored as a set of selected component values 305

In a third approach, in a case of desired capability records 242 that have ranges of values, a correlation method 332 (FIG. 3) may be used that combines ranges of the desired capability records 242 to find ranges that are common to the desired capability records 242 of the table 220, In a manner similar to that explained for the filtering method 331a, the filtering method 332 may also include a filtering of one of the types 331a, 331b, 332 between the result of the range combing operation and the set of available components 320 before a final result is stored as a set of selected component values 305.

In a fourth approach to determining capabilities of an electronic device, in a case where a desired feature is not presently available in the electronic device, but components are available in the device that could be combined to form a new application to provide the feature, such components are combined using a segmentation-recombination process 334 (FIG. 3) to provide the new application, enabling a more optimal match to the set of desired capabilities. The components may be duplicated or, in cases in which a component can be multitasked, the desired sets of values for the attributes of a component while it being used for the new application can be established. Once this new application has been created, the sets of values for the attributes of the components are selected to be within the available sets of values by using one or more of the filtering processes 331a, 331b, 332 to filter desired capabilities of the feature and the available sets of values of the new application. This process may be extended down one level so as to form a new component from sub-components (applets or servlets) already used within the electronic device. In this instance, when a new component is formed it is added to the set of available components 320 for potential use in yet other applications.

One or more of the filter methods 333 can reconcile the desired attributes of a set of desired capabilities 310 with the set of available components 320. By filtering the desired capabilities for a device with the available components in an electronic device, a configuration is determined for the electronic device. This filtering gives the capabilities "wish list" a "reality check" as to the available components on an electronic device. Stakeholder requirements can also be added to this filtering to perform a correlation that further filters and prioritizes the configuration choices as will be described below.

Each electronic device is associated with an available components database, also known as the set of available components 320. The components database 320 is stored in a memory which may be the memory of the electronic device, depending on a chosen system configuration. The set of available components 320 contains lists of the components available in the electronic device, which may be in the form of available component records 222. The set of available components 320 also records, for each component, set of values of attributes of that component. For example, the attributes of a camera component would define the kinds of images producible by the camera such as mpeg or jpg.

Depending on the service level a user has purchased from a service provider, from a manufacturer, from an application provider, from a software provider, or from other stakeholders, certain attributes of components or some entire components may or may not be chosen or enabled in the electronic device. The user may be considered to be a stakeholder and may desire his or her own values for attributes of certain components within the electronic device.

The influence of the various stakeholders is reflected by the priority entries in a set of stakeholder requirements 320 associated with a common capability, or a merged set of stakeholder requirements 320, which may be embodied as stakeholder requirements tables 205. These stakeholder requirements may be located in the portable device and in some embodiments may be updated by the user of the portable device. The electronic device uses priority entries in the stakeholder requirements table 205 in a correlation method 133 to negotiate the configuration of the electronic device. The stakeholder priorities can thus establish an equilibrium or stable solution among dynamic stakeholder requirements.

Certain embodiments of the present inventions provide methods for negotiation of final values of the set of selected component values 305 (which determined the configuration) based on stakeholder priorities. The methods 339 determine the configuration of the electronic device in some embodiments by a correlation process that filters sets of values in one or more of the stakeholder capability records 212 with available component records 222 for a particular electronic device, and by using stakeholder priorities from a stakeholder requirements table 205 to resolve any conflicts that arise from the correlation. These priorities allow for negotiation of the selected attribute values for the components of the electronic device. An example use is the selection of attribute values for the components of a mobile phone based on a purchased subscriber service level. The purchased subscriber service level may be indicated within the stakeholder priorities for a particular end user or device.

The filtering that occurs in the correlation between the records of the stakeholder requirements 330 and the set of available components 320 can be a matching process followed by thresholding. After the thresholding, conflict resolution can be applied. An example of one matching process is to take the vector dot product on the capability records of the stakeholder requirements table 205 against the records 222 of the available components table 210. This is then followed by thresholding to select the best matching rows that are above a certain threshold (as shown in an earlier example). The rows above the threshold are then run through one of the conflict resolution processes of the correlation methods 339, and ranked and accepted based on the stakeholder. This step is needed since in some cases conflicts may not permit all rows to be realized at the same time on one device. If such a conflict between two rows does occur, the higher ranked row is accepted and the lower ranked row will be rejected.

A first embodiment of the correlation methods 339 is method 335 that uses stakeholder priority based conflict resolution. In this approach, a combination of two or more sets of stakeholder requirements 330 is cast as a constrained linear optimization problem with the constraints ordered according to the stakeholder priorities. There are a number of well known methods in the literature for solving these types of constrained optimization problems, including linear programming, simplex methods and convex hull methods. Examples can be found in Principles of Operations Research, H. M. Wagner, 1975. In all of these methods, the basic approach is to minimize some measure of dissatisfaction, which is a weighted combination of the degree of dissatisfaction of all of the constraints. Constraints determined by high priority stakeholders are assigned higher weights and are thus more likely to be resolved early. The optimization method will proceed until a global minima is found. The general method allows constraints to be defined in terms of continuous ranges of values, but a simplification is to allow each constraint to simply be represented by a binary variable which is 0 if the constraint is satisfied and non-zero otherwise. For this special case, binary programming can be used which is a more efficient form of optimization algorithm.

A second embodiment of the correlation methods 339 is method 337 that uses filter, or attribute, based conflict resolution. This is a simpler and much more efficiently implemented form of conflict resolution. It is not, in general, guaranteed to provide an optimal solution, but it does guarantee that the constraints of the highest priority stakeholder are completely met, and as many non-conflicting constraints of subsequent stakeholders are met as possible.

The approach is fairly simple, and can be illustrated by considering a particular example. Imagine that there are three stakeholders: a service provider, a location owner and the device owner. The service provider has a requirement that emergency messages which it transmits to an end-user device must create an audible ring of at least level 3 (assume we have 10 volume levels for illustration). Currently the user is in a restaurant which requires any audible ring to be of a maximum volume of 4. Finally, our user is suffering some hearing loss, and has a preference that any audible ring be of at least level 5. We assume here that the priority ordering of stakeholders is that the service provider has highest priority and the end user lowest priority. The constraint of the first stakeholder says that the volume must be greater than or equal to 3, so any value from 3 to 10 is valid after considering this stakeholder. The second stakeholder adds a constraint of volume less than or equal to 4. So "anding" these two constraints we have the volume must be greater than or equal to 3 and less than or equal to 4. An audible ring level of 3 or 4 allows the constraints of both the first and second stakeholder to be met. The constraint of the third stakeholder is incompatible with the constraint of the second stakeholder, so it will not be satisfied and the combination of constraints stops at this point. If each constraint is considered to be a filter on allowed values of a variable, then these filters are being combining together as long as they are compatible with each other, until a tightest possible filter is generated.

The filtering methods 333 and correlation methods 339 are performed by one or more processors operating under control of programmed instructions, as is known in the art, using the sets of desired capabilities 310, the set of available components 320, and the stakeholder requirements 330 as inputs and generating the set of selected component values 305 as outputs. The sets of information 310, 320, 330, 305 are stored in memories. The processing may be performed by a processing system in the electronic device for which the set of selected values of the components 305 are being determined, or may be performed in a server of network to which the electronic device has wired or wireless access. Accordingly, the location of the memories is typically determined by conventional factors such as the amount of resources in the electronic device, which may be limited, versus delays caused by accessing information from remote memories. In some embodiments, only the set of selected component values is stored in the electronic device, in order to maintain the configuration of the electronic device, and the processing to update the set of selected component values is performed in a server, where the other sets of information are kept. In other embodiments there may be sufficient resources to maintain all the necessary information in the electronic device. In these embodiments, a merged set of previously correlated stakeholder requirements may be kept in the electronic device, and referred to simply as a prior stakeholder requirements. The merged set of stakeholder requirements may maintain previously correlated sets of values of attributes of the one or more stakeholder desired capabilities, along with some priority information, so that a new stakeholder requirements can be correlated with the merged stakeholder requirements and the available set of components to determine a new set of selected component values.

Some of the above descriptions have discussed filtering and correlation methods (those included in methods 333, 339) that would be conveniently done between two similar data structures, such as two records of a table or two tables, and some have discussed operations that might be done conveniently between more than two structures. It will be appreciated that determining correlations between desired capabilities and/or stakeholder capabilities that are represented by more than two similar data structures (either records or tables) can typically be done by performing filtering or correlation between any two and then iterating through the others, doing a correlation with the results of a previous correlation. This can be done to filter or correlate more than two records of a table, or the records in a plurality of tables. Such an approach may be employed in certain embodiments as the most convenient approach, in order to minimize the quantity of programming instructions needed to accomplish the method.

Figure 4:
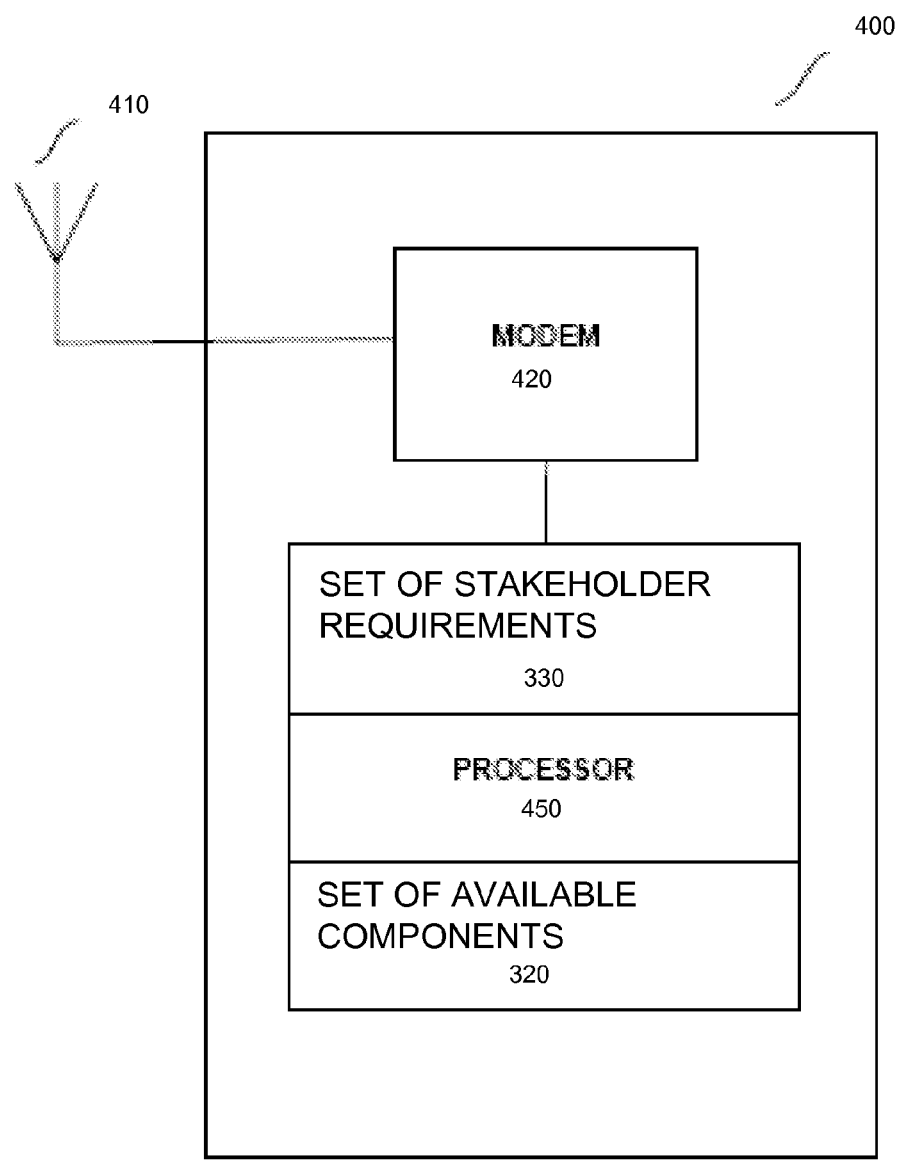
FIG. 4 is a schematic block diagram of an electronic device according to certain embodiments.

FIG. 4 is a schematic block diagram of an electronic device 400 according to certain embodiments. A modem 420 such as a radio transceiver is coupled to an antenna 410. The modem 420 communicates with a processor 450. The modem 420 may receive a set of stakeholder requirements 330, perhaps in the form of a stakeholder requirement table 205, and/or a set of desired capabilities 310 (not shown in FIG. 4) from a network to store in a device memory for the processor 450. Further, the processor 450 has access to the set of available components 320 of the electronic device 400. The set of available components 320 is typically established in the electronic device 400 at the time of its manufacture, but could be downloaded or updated over the modem 420. Also, the set of desired capabilities and/or the stakeholder requirements 330 could be established by the electronic device 400 rather than being received from the network over the modem.

The processor 450 can perform a filtering or correlation within the electronic device 400 to determine the operation characteristics using the set of desired capabilities 310, the set of available components 320 and the stakeholder requirements 330. The processor 450 can execute a conflict resolution process to resolve conflicts among stakeholder requirements such as arbitrating among at least two of the stakeholders or using a stakeholder requirements table. The processor 450 can override the stakeholder requirement of the stakeholder requirements table. The set of desired capabilities 310 can comprise the stakeholder requirements table.

Although a radio transceiver and antenna is illustrated for the electronic device 400 of FIG. 4, an antenna is not necessary and a wired network connection can be used instead. Further, the electronic device 400 can be any processor based electronic device for which configuration management is desirable, including but not limited to consumer, business, and military electronic devices used in places such as homes, vehicles, and offices. Non-limiting examples include home entertainment systems, vehicular telematics, personal computers, laptop devices, personal digital assistants (PDA), portable gaming units, cameras, multimedia players, set top boxes or cellular telephones.

FIG. 5 is a diagram of an exemplary available components table 210 according to some embodiments. The available components table 210 defines some of the available components of a given electronic device, based upon an intersection of each component of a given device and the attributes of each component. A camera component, for example, would have its attributes defined as the kinds of images producible by the camera such as mpeg or jpg. A display component, for example, would have its attributes defined as the kinds of images producible by the display, such as jpg and mpeg images, and also the kinds of audio, such as wav and mpeg audio. A keypad component could have its attributes defined, for example, as the one or more kinds of audio produced for key click feedback.

The set of available components for an electronic device may include a plurality of such tables (or other arrangements of the information). As examples, for other capability categories such as a compatible network's bandwidth or signaling protocols, or a service provision's capability such as text only vs. multi-media messaging, similar tables of relevant attributes would exist for specific available components.

FIG. 6 is a diagram of an exemplary desired capabilities table 220 according to some embodiments. Each desired capabilities table 220 provides information defining desired characteristics for a device such as a portable electronic device. A desired characteristic can be expressed as a desired capability with a set of desired characteristic values 605 (which may in some cases be one or no value), wherein each of the set of characteristic values 605 expresses desired values for a user interface category of a capability of a device (in this example). As noted earlier, a desired characteristic may in some cases be directly equivalent to an attribute of the set of available components, but in many cases may need to be transformed into one or more such attributes before filtering or correlation is performed. Such transformation can be performed using a function for each category that changes the sets of characteristic values of a category into a set of values for one or more attributes associated with a category.

Examples of desired device capabilities include both audible and tactile alerts, keys, key press, text input methods such as handwriting recognition, speech dictation capture, video and imaging capabilities and are illustrated along the vertical axis of FIG. 6. Examples of desired device user interface categories include visual, audible, tactile, gesture, olfactory and other biometrical representations of user interface categories and are illustrated along the horizontal axis of FIG. 6.

Example sets of characteristic values include size, resolution, and duration and location within the device. Size indicates a desired height of a font or the volume of a sound, for example. Resolution indicates a desired pixel density of a display or image, for example. Resolution can indicate a desired sampling rate of audio or desired key characteristics such as a number of keys, the length or size of a stroke or gesture on a touch sensitive input, or an n-way navigational key. Duration indicates a desired persistence for visual capabilities, for example. Time or persistence indicates a desired auditory or vibratory modality, for example. Location indicates desired two-dimensional coordinates for graphical displays or vibratory and haptic inputs or outputs, for example. Location can also indicate, for example, a desired three-dimensional space for audio, or alternatively to the space of pitch. The sets of characteristic values 605 can define not only capabilities but also constraints.

The desired characteristic value information of a capability in a desired capabilities table 220 can be expressed using a range of values (e.g., 2-11), a discrete value (e.g., 2) or both (e.g., 2, 8-11, 200). A characteristic value can define a desired persistence, for example, of an alert or a key press. The ranges can be defined by a desired maximum and minimum range of characteristics for one or more user interface elements. A discrete value can define a desired characteristic for one or more user interface elements. A set of characteristic values could also be an expression of items from which one or more may be selected.

FIGS. 7 and 8 are tables of stakeholder priority requirements according to certain embodiments of the present inventions. The stakeholder priority requirements tables contain data indicative of a stakeholder priority sequence 410 for each capability of the electronic device.

Exemplary hardware features are illustrated in FIG. 7 for applications on the electronic device. Various hardware protocols such as GSM, WiFi, Bluetooth and audio chip as well as various output protocols such as visual LCD and LED outputs, for example, are illustrated along the horizontal axis of the stakeholder hardware priority requirements table of FIG. 7. Different applications such as idle screen, phone call, music player and messaging are illustrated along the vertical axis of the stakeholder hardware priority requirements table of FIG. 7.

Exemplary software features are illustrated in FIG. 8 for applications available on the electronic device. Various software protocols such as GSM, Java, and universal plug and play UPNP, for example, as well as various output and input protocols such as visual, audible, haptic and smell are illustrated in the stakeholder hardware requirements table of FIG. 8. Different applications such as idle screen, phone call, music player, messaging and camera are illustrated along the other axis of the stakeholder software priority requirements table of FIG. 8.

In the representation of the example in FIGS. 7 and 8, each stakeholder has a stakeholder number S1, S2, S3, S4, etc. The stakeholder priority requirements tables 700 and 800 define priorities for each of a plurality of the stakeholders. The priority of each stakeholder relative to other stakeholders is illustrated by stakeholder priority sequence 710 in the exemplary table of FIG. 7 by the order in which the stakeholder numbers are placed. Other methods could be used to define the relative priorities, such as using a priority value for each stakeholder. In this embodiment as implemented for the example of FIG. 8, this could be a series of 4 numbers in each intersection of the table representing, in each case, the priority for the stakeholders S1, S2, S3, S4, such as: {34, 25, 67, 45) where each stakeholder may have a priority in a range from 1-100.

The priority numbers for the stakeholders here define which hardware features apply to which applications according to the stakeholder priorities. In the embodiment being illustrated in FIGS. 7 and 8, each stakeholder may have an associated desired capabilities table (not shown) that goes with the stakeholder priority table, which defines sets of desired values for the capabilities. In other embodiments, there may be a stakeholder's table 205 for each stakeholder in which a priority value (such as a value from 1-100) and a set of values (that characterize the characteristic) are defined for each intersection of a capability and characteristic (or attribute). Thus, the stakeholder software requirements tables of FIGS. 7 and 8 and associated desired capabilities tables can be correlated against the set of available components to determine the features to implement for the electronic device. In the case of a conflict between the desires of stakeholders, the stakeholder priority is used in the correlation process to resolve the conflict and choose the features to implement.

Values can be received over the network from a service provider to store in a stakeholder requirements table. The values of the stakeholder requirements table can be determined based on a degree of service provider subsidy. They can be set initially on service provider setup and then altered upon subsequent setup changes initiated by the service provider.

Figure 9:
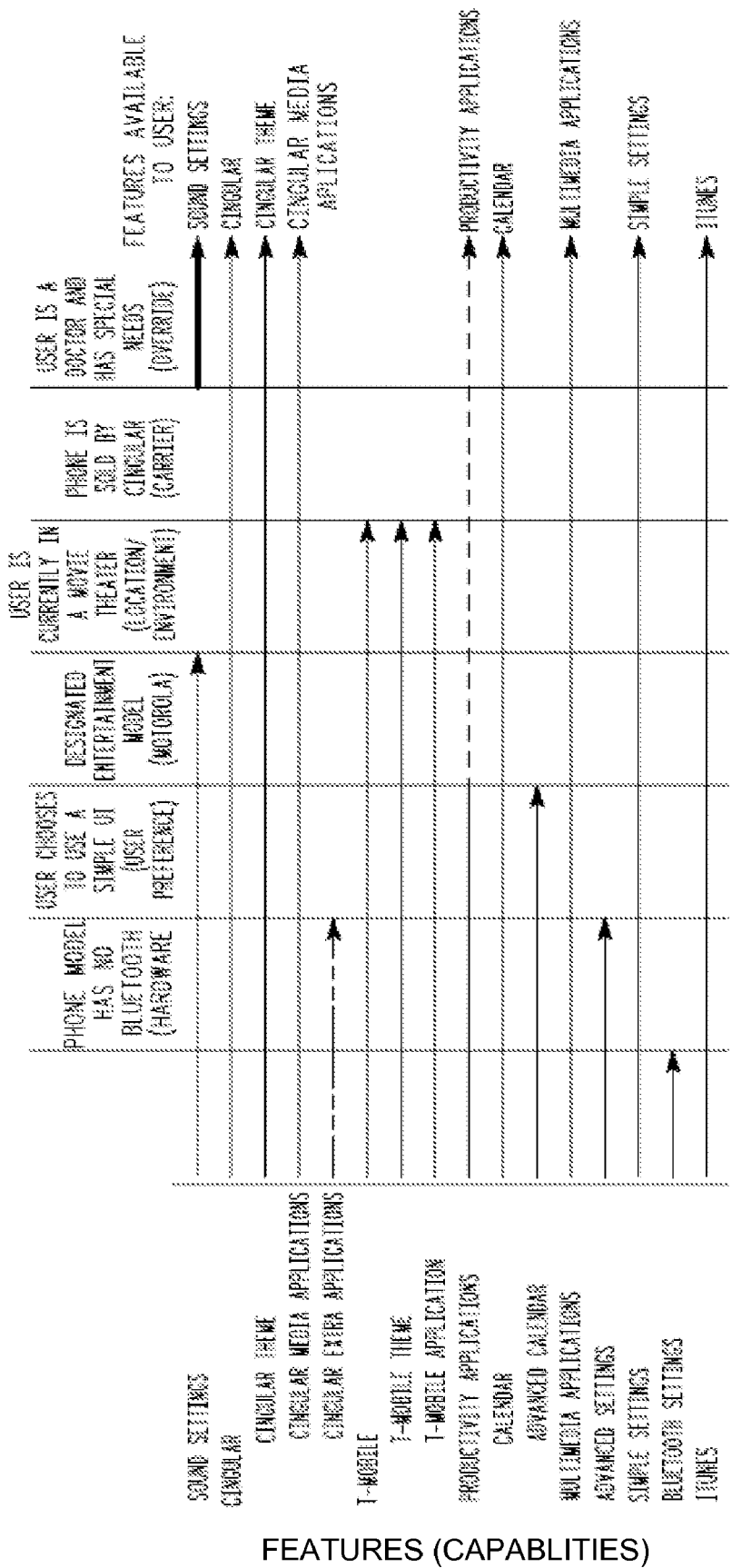
FIG. 9 shows an exemplary stakeholder requirements filter table according to certain embodiments.

FIG. 9 shows a stakeholder requirements filtering table according to certain embodiments, which can be easily constructed from the stakeholder requirements tables (FIGS. 7 and 8). Conflicts among stakeholder requirements can be resolved by a processor using a stakeholder filter such as that of FIG. 9.

Exemplary hardware and software features available on the electronic device are illustrated in FIG. 9. Various of these features such as sound settings, Cingular features (Cingular theme, Cingular media applications and Cingular extra applications), T-Mobile features (T-Mobile theme and T-Mobile media applications), productivity applications, calendar, advanced calendar, multimedia applications, advanced settings, simple settings, Bluetooth settings, and iTunes from Apple Computer, Inc., for example, are illustrated in the stakeholder requirements filtering table of FIG. 9. Filtering constraints such as Bluetooth, user interface UI user preference (such as simple UI), device model (such as entertainment model), location—environment (such as theater), carrier (such as Cingular) and overrides (such as needs of a medical doctor user) are illustrated along the other axis of the stakeholder requirements filtering table of FIG. 9.

In the representation of the example in FIG. 9, when a feature is assessed such as upon a request, the feature is passed through a series of the filtering constraints. The filtering constraints define whether a feature is allowed. The passing of the features through the filtering constraints is represented by the arrows illustrated in FIG. 9. The filter constraints generally act as AND gates to require all constraints are met. An override filtering constraint acts as an OR gate to allow a feature regardless of whether the other constraints are met. Priorities for each of a plurality of the stakeholders are resolved using this alternate table. By establishing the filter constraints for each feature and needs of the stakeholders, this alternate table representing a method for making these decisions is provided.

Although the embodiments of FIGS. 7, 8 and 9 show specific examples of tables representing methods of making decisions, given the description described herein, other variant data arrangements can be used to achieve the same result.

Figure 10:
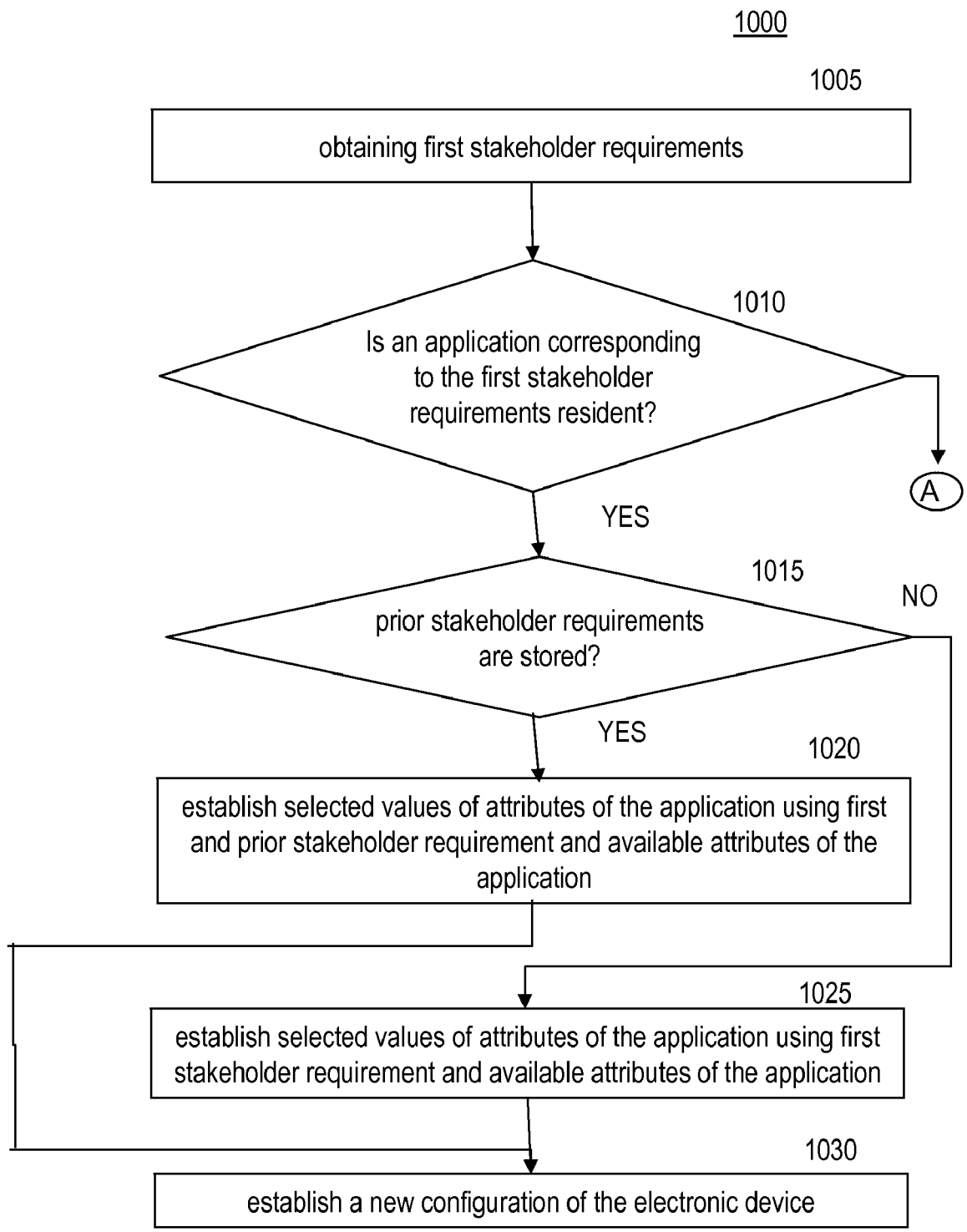
FIGS. 10, 11 and 12 show some steps of methods for configuring an electronic device, in accordance with certain embodiments
Figure 11:
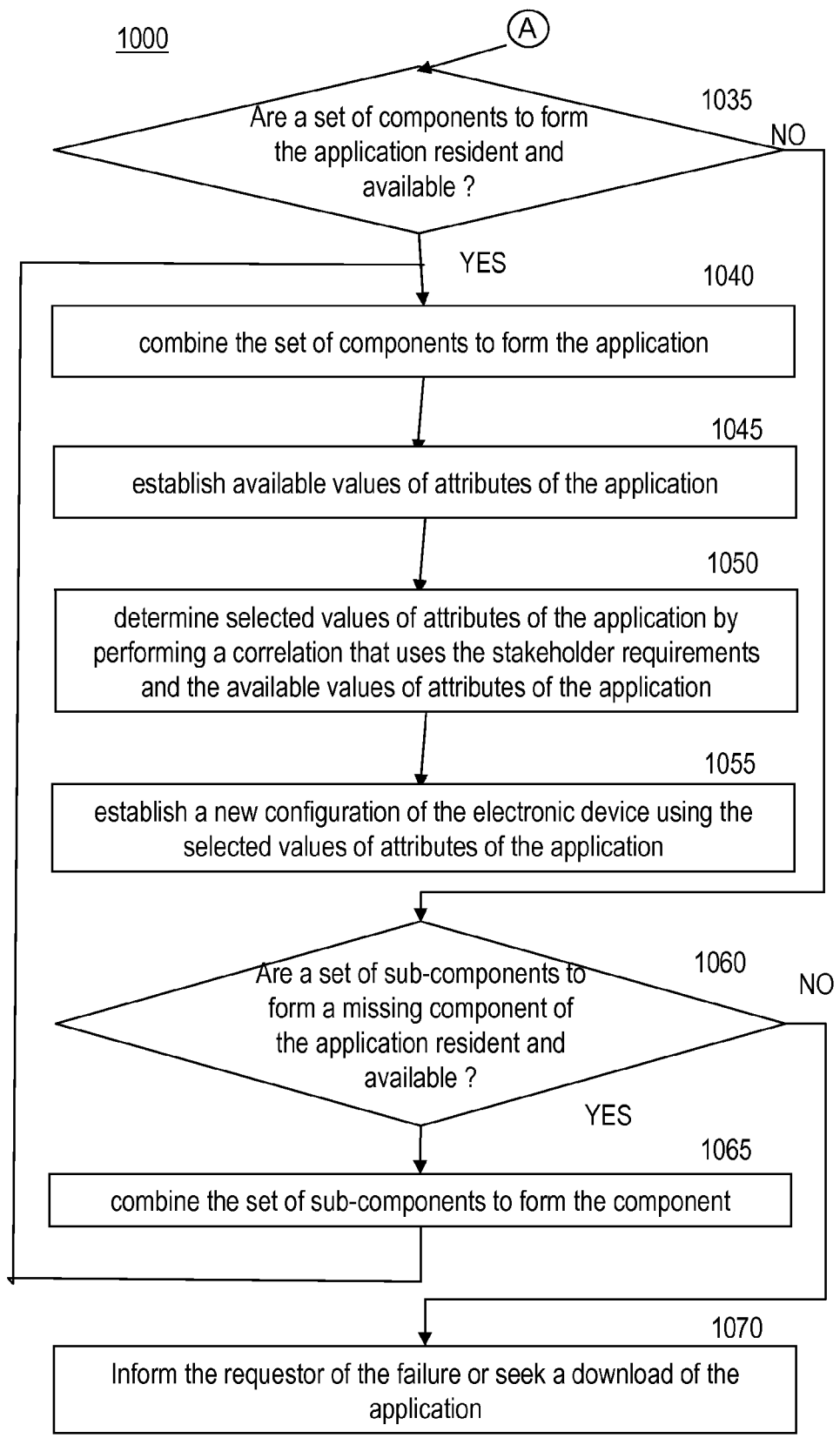

Referring to FIGS. 10 and 11, some steps of a method 1000 for configuring an electronic device are shown, in accordance with certain embodiments. The method 1000 describes a configuration process at a high level. The process starts with obtaining stakeholder requirements of a first stakeholder at step 1005 (FIG. 10). A determination is made at step 1010 as to whether an application corresponding to the first stakeholder requirements is resident in the electronic device. When the determination at step 1010 is affirmative, a determination is made at step 1015 as to whether prior stakeholder requirements are stored for the electronic device. When the determination at step 1015 is affirmative, selected values of attributes of the application are established at step 1020 by performing a correlation that uses the first and prior stakeholder requirements and the available values of attributes of the application. The correlation may involve filtering of attributes and negotiation of priorities to determine some attribute values. It will be appreciated that performance of the correlation may require a conversion of capabilities to attributes, as described herein. It will be further appreciated that, in certain instances, the stakeholder requirements may be obtained simply as a set of desired capabilities without any explicitly stated priorities, such as a user entered set of desired capabilities. In such an instance, and when prior stakeholder requirements are stored for the electronic device, then a priority or priorities may be assigned by a default process to the obtained set of desired capabilities in order to perform the correlation. For example, a priority may be assigned based on a source of the desired capabilities. The prior stakeholder requirements may have priorities assigned for each set of values of attributes by a correlation process that had been performed on one or more prior stakeholder requirements, or the prior stakeholder requirements may have one or more default priorities assigned if it was obtained as a set of desired capabilities.

When the determination at step 1015 is negative, then at step 1025 selected values of attributes of the application may be established by performing a filtering that uses the first stakeholder requirements and the available values of attributes the application. After completion of either step 1020 or 1025, a new configuration of the electronic device is established at step 1030 using the selected values of attributes of the application When the determination at step 1010 is negative, a determination as to whether a set of components that can be used to form the application are resident in the electronic device and available for reuse is made at step 1035 (FIG. 11), When the determination at step 1035 is affirmative, then the set of components are combined to form the application at step 1040, available values of attributes of the application are established at step 1045, selected values of attributes of the application are determined at step 1050 by performing a correlation that uses the stakeholder requirements and the available values of attributes of the application, and a new configuration of the electronic device is established at step 1055, using the selected values of attributes of the application. The application is then stored in the electronic device as an available application of the electronic device, with the established available sets of values of attributes of the application.

When the determination at step 1035 is negative, then a determination is made at step 1060 as to whether a set of sub-components to form a missing component of the application is resident in the electronic device and available for reuse. When the determination at step 1060 is positive, the sub-components are combined to form the component at step 1065, and the method continues at step 1040. The missing component is then stored as an available component of the electronic device.

When the determination at step 1060 is negative, then the requester of the new feature may be informed of the situation and/or the necessary application may be automatically sought elsewhere than within the electronic device.

The steps 1035 through 1065 may be termed a segmentation-recombination process. An example of a segmentation-recombination is shown in FIG. 1, in which a stakeholder's desired feature of a speaking sign translator is obtained by segmenting and recombining a camera component of a bus card reader with a language translator and a text to speech (TTS) component of a bi-lingual dictionary.

Figure 12:
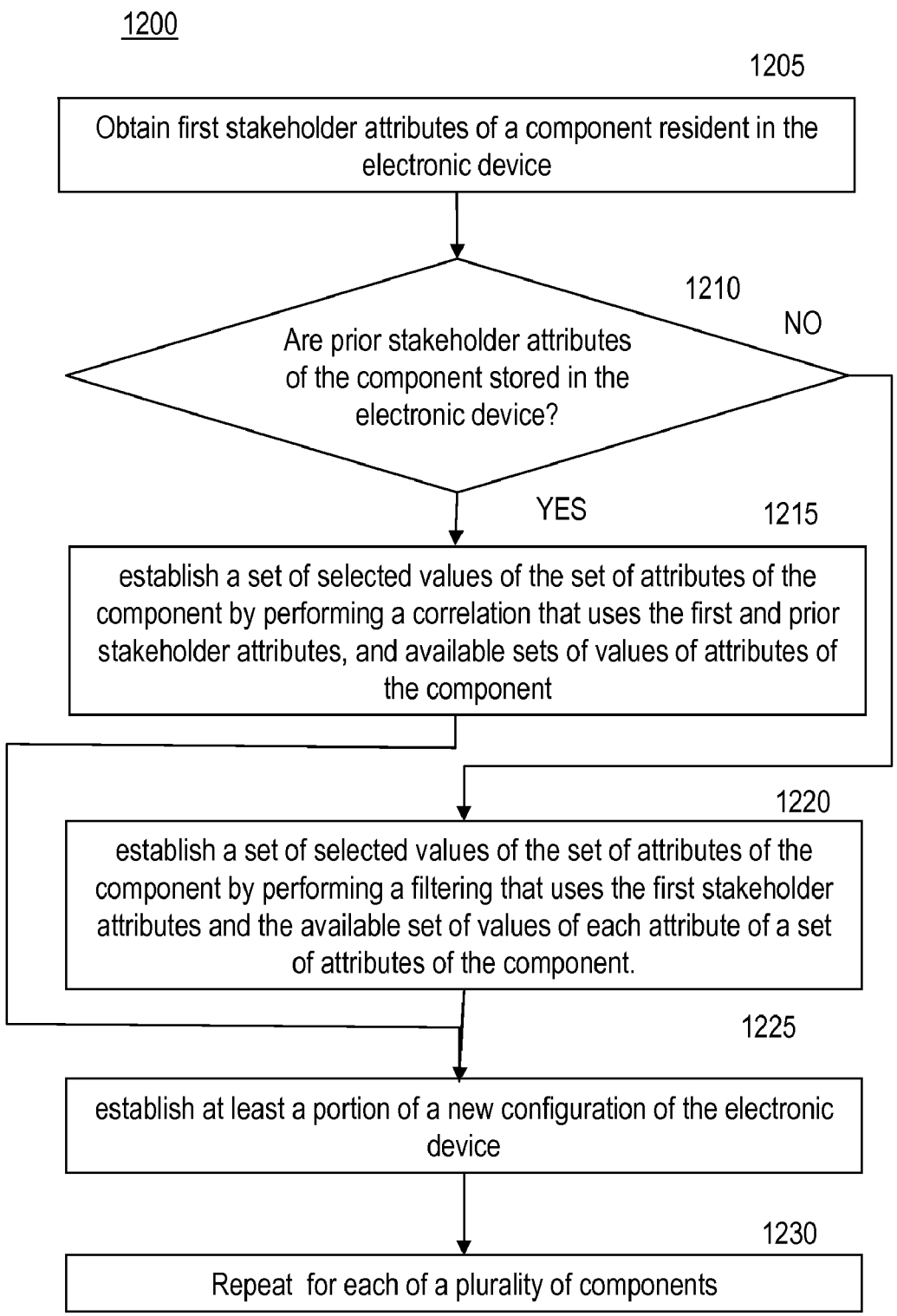

Referring to FIG. 12, some steps of a method for configuring an electronic device are shown, in accordance with some embodiments of the present invention. At step 1205, first stakeholder attributes of a component resident in the electronic device are obtained. At step 1210, a determination is made as to whether prior stakeholder attributes of the component are stored in the electronic device for one or more prior stakeholders. When the determination is affirmative at step 1210, a set of selected values of the set of attributes of the component is established at step 1215 by performing a correlation that uses the first and prior stakeholder attributes, and available sets of values of attributes of the component. When the determination at step 1210 is negative, a set of selected values of the set of attributes of the component is established by performing a filtering that uses the first stakeholder attributes and the available set of values of each attribute of a set of attributes of the component. The set of selected values of the attributes of the component determined at one of steps 1215 and 1220 are used at step 1225 to establish at least a portion of a new configuration of the electronic device. In some instances, the first stakeholder attributes are derived from a set of first stakeholder requirements that correspond to at least one application that comprises a plurality of components. In these instances the obtaining of first stakeholder attributes at step 1205; and one of the steps of establishing a set of selected values by correlation (step 1215) and establishing a set of selected values by filtering (1220); and the step 1225 of establishing at least a portion of a new configuration, are repeated for each of the plurality of components.

The embodiments described herein provide an improved user experience in many situations, and permit convenient, dynamic configuration of the electronic device in response to the desires, needs, and requirements of a number of stakeholders that have an interest in the configuration of the electronic device.

It will be appreciated that not all of the steps of the methods described above with reference to FIGS. 10-12 need to be performed in the order specified in order to achieve the benefits of the embodiments described Although the inventions have been described and illustrated in the above description and drawings, it is understood that this description is by example only, and that numerous changes and modifications can be made by those skilled in the art without departing from the true spirit and scope of the inventions. Although the examples in the drawings depict only example constructions and embodiments, alternate embodiments are available given the teachings of the present patent disclosure.

What is claimed is:

1. A method for managing a configuration of an electronic device, the method comprising:
   obtaining first stakeholder requirements;
   making a first determination as to whether an application corresponding to the first stakeholder requirements is resident in the electronic device;
   when the first determination is affirmative:
      making a second determination as to whether prior stakeholder requirements are stored for the electronic device;
      when the second determination is affirmative, establishing selected values of attributes of the application by performing a correlation that uses the first and prior stakeholder requirements and available values of attributes of the application;
      when the second determination is negative, establishing selected values of attributes of the application by performing a filtering that uses the first stakeholder requirements and available values of attributes of the application; and
      establishing a new configuration of the electronic device using the selected values of attributes of the application; and
   when the first determination is negative:
      making a third determination as to whether a set of components that can be used to form the application are resident in the electronic device and available for reuse; and
      when the third determination is affirmative:

combining the set of components to form the application;

establishing available values of attributes of the application;

determining selected values of attributes of the application by performing a correlation that uses the stakeholder requirements and the available values of attributes of the application; and establishing a new configuration of the electronic device using the selected values of attributes of the application.

2. A method for managing a configuration of an electronic device, the method comprising:

obtaining stakeholder requirements of a stakeholder feature;

making a first determination as to whether an application corresponding to the stakeholder feature is resident in the electronic device; and when the first determination is negative:

making a second determination as to whether a set of components that can be used to form the application corresponding to the stakeholder feature are resident in the electronic device and available for reuse; and when the second determination is affirmative:

combining the set of components to form the application;

establishing available sets of values of attributes of the application;

deriving values of stakeholder attributes from the stakeholder requirements;

determining a set of selected values of the application by performing a correlation that uses the values of the stakeholder attributes and the available sets of values of attributes of the application; and establishing a new configuration of the electronic device using the set of selected values of the attributes of the application.

3. The method according to claim 2 further comprising:

storing the application as an available application of the electronic device with the established available sets of values of attributes of the application.

4. The method according to claim 2 further comprising:

when the second determination is negative:

making a third determination as to whether a set of sub-components to form a missing component of the application is resident in the electronic device and available for reuse; and when the third determination is positive, combining the sub-components to form the missing component.

5. The method according to claim 4 further comprising:

storing the missing component as an available component of the electronic device with the established available sets of values of the attributes of the component.

* * * * *